United States Patent Office 2,808,723
Patented Oct. 8, 1957

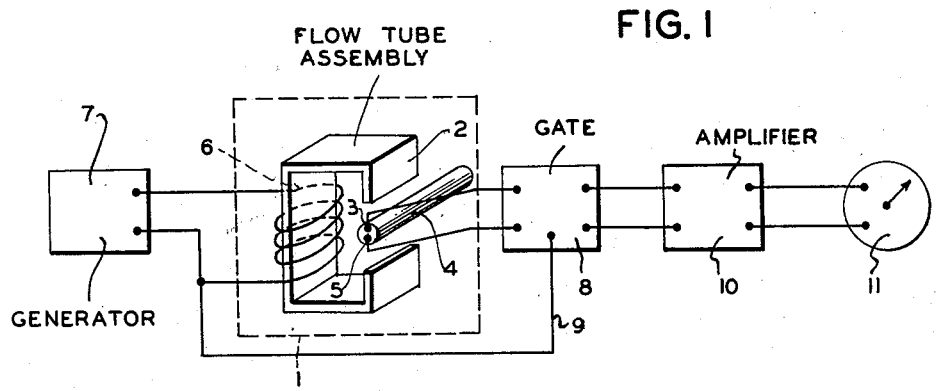
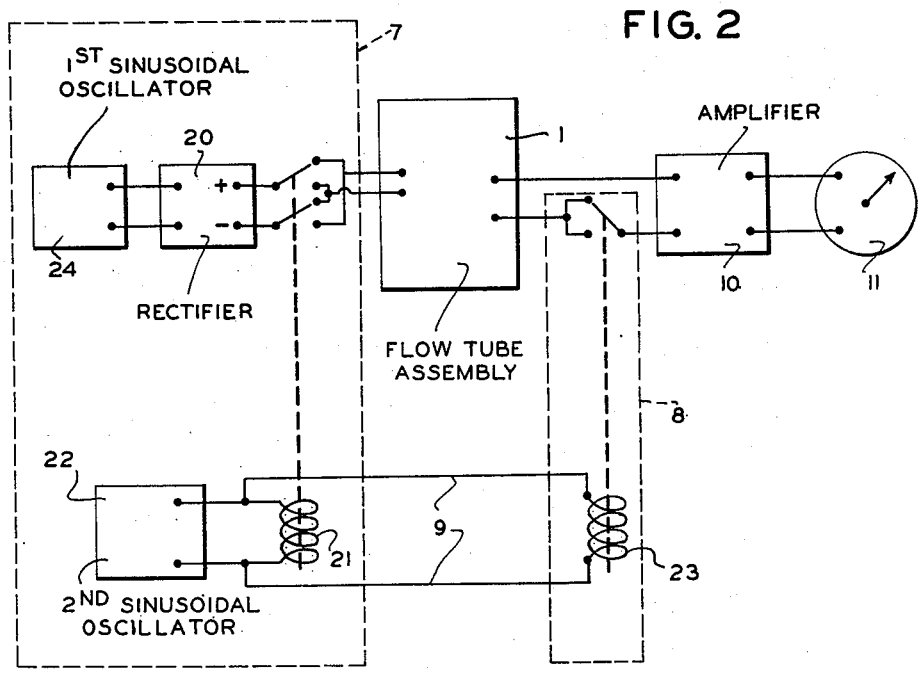

2,808,723

MAGNETIC INDUCTION FLOWMETER

Rudolph W. Buntenbach, Summit, N. J., assignor to Vitro Corporation of America, Verona, N. J.

Application November 9, 1953, Serial No. 390,920

9 Claims. (Cl. 73—194)

My invention relates to flowmeters for measuring the rate of flow of fluid through a conduit and more particularly relates to magnetic induction flowmeters of this general type.

The operation of a magnetic-induction flowmeter is based on Faraday's law of induction. When an electrically conductive fluid is constrained to travel through a conduit or pipe oriented at right angles to a magnetic field and when a pair of electrodes are suitably attached to the pipe to make direct or indirect contact with the fluid, a voltage proportional to the instantaneous average velocity of the fluid will be induced in the fluid and will appear across the electrodes. This voltage, after suitable amplification, is then supplied to a properly calibrated voltmeter which indicates the rate of flow.

When the magnetic field is held constant and the fluid column travels at a constant rate through the conduit, a constant voltage is induced which eventually causes electrode polarization and renders the flowmeter unusable. Non-polarizable electrodes are available but are cumbersome and difficult to use effectively. Consequently, polarization is generally avoided by employing an alternating rather than a constant magnetic field.

However, when an alternating magnetic field is used, an alternating voltage is induced in the fluid which has a first component in phase with the magnetic field and proportional to the fluid flow and which has a second component in quadrature with the magnetic field that is induced in the fluid because of the build-up and decay of the magnetic flux and is independent of the rate of flow. Moreover, for fluids of very high resistivity, the flow itself generates a quadrature component when the flux varies.

Since these quadrature components adversely affect the accuracy of a flowmeter, it is conventional to minimize the adverse effects by developing voltages equal in magnitudes to these components but opposed in phase and then applying these voltages to the flowmeter to oppose and cancel these components.

As long as all voltages are sinusoidal with relatively constant amplitudes and are not subject to frequency variations, this cancellation technique is useful. However, the quadrature components are subject to considerable variations in amplitude. Moreover, flowmeters are normally used in conjunction with other electrical devices, and variable ground currents, irregularities in supply voltages and the like create transients which are not cancellable in this manner and seriously impair the accuracy of the flowmeter.

I have invented a magnetic induction flowmeter which is rendered insensitive to transients of this kind and which does not respond to these quadrature components.

Therefore, it is an object of the present invention to provide a new and improved flowmeter of the character indicated.

Another object is to provide a flowmeter which only indicates fluid flow at instants when its magnetic field attains a constant value.

A further object is to provide a flowmeter which only indicates fluid flow at instants when its magnetic field attains its maximum or minimum value.

Still another object is to provide a flowmeter whose alternating magnetic field takes the form of a periodic square wave.

Yet a further object is to provide a flowmeter whose magnetic field is shock-excited from a direct voltage source.

These and other objects of the invention will either be explained or become apparent when this specification is studied in conjunction with the accompanying drawings wherein:

Figure 1 illustrates the present invention in block form; and,

Figure 2 illustrates the present invention in partial schematic form.

Briefly stated, my invention contemplates a magnetic induction flowmeter which includes a magnet provided with an excitation winding and a gap. A flow tube with spaced electrodes is oriented within the gap. The winding is excited with a periodic alternating voltage which attains a constant value over an appreciable interval within each half cycle; during these intervals, the magnetic flux does not change appreciably and the flow signal appearing across the electrodes contains no quadrature component. A conditionally responsive signal transfer device actuated only during these intervals is included in the system and is coupled at its input to the electrodes. The output of the network is connected to an indicating meter which indicates the rate of flow. Consequently, the meter only indicates the rate of flow at intervals when the flow signal contains no quadrature components and the adverse effects of these components are eliminated from the system.

Referring now to Figure 1, a flow tube assembly is identified generally at 1 and includes a magnet 2 provided with excitation winding 6 and a gap 3. A flow tube 4 having spaced electrodes 5 is oriented within gap 3. The electrodes 5 are connected to the input of a conditionally responsive signal transfer device 8, the output of device 8 being fed through an amplifier 10 to an indicating device 11. A generator 7 supplies a periodic alternating excitation voltage to the winding 6 of magnet 2.

Generator 7 can be a conventional sinusoidal oscillator which produces a voltage of sufficiently large amplitude to saturate the magnet over an appreciable interval of each half cycle. Alternatively, generator 7 can be a conventional function generator producing an excitation voltage which remains substantially constant over an appreciable interval of each half cycle. Such a voltage, for example, can have a wave form of a square wave. Thus the magnet is either saturated or excited by a constant voltage during regularly spaced intervals; consequently, no quadrature components can be introduced in the flow signal induced across electrodes 5 during these intervals.

Device 8 can be any conventional electric structure such as an electronic switch or gate or relay which is characterized by a first state in which signals appearing at the electrodes are passed through the network to the amplifier and thence to the indicator and is characterized by a second state in which the signals are blocked.

To insure that the network attains its respective states in accurate relation to the excitation conditions of the magnet, I control and synchronize device 8 with generator 7 by connecting the output of the generator through conductor 9 to the network. By this means, the excitation voltage supplied to the excitation winding is also supplied as a control voltage to the device. The device is designed in a conventional manner to be actuated and attain the first state only during the regularly spaced intervals previously referred to. For example, when the generator is of the sinusoidal type, the excitation voltage must attain a certain minimum amplitude before saturation occurs; in this situation, the device will be designed to attain the first state as soon as the amplitude reaches this value and to return to the second state when the amplitude falls below this value. When the generator is of the type that produces a square wave, the network will be designed to attain the first state as soon as the excitation voltage attains its constant value and to return to the second state when this voltage is changing.

Figure 2 shows the invention shown in Figure 1 in more detail, the elements common to both figures being identified with like numbers.

The generator 7 includes a first oscillator 24 which generates a first sinusoidal voltage of given frequency, for example, 60 cycles per second. This voltage is then supplied to a conventional rectifier 20 which rectifies this voltage to produce, at its output terminals, a direct voltage with polarity indicated. The positive and negative terminals are each connected to a pole of power relay 21. The make and break contacts of this relay are connected in the manner indicated to the excitation winding of the flow tube assembly shown in block form 1.

A second conventional oscillator 22 produces a second sinusoidal voltage of different frequency, for example, 10 cycles per second. The second voltage is supplied to the winding of relay 21 to switch the relay between its two positions at this frequency. The effect of this switching is to shock excite the winding of the magnet with direct voltage of alternating polarity; it will be apparent that the effect on the magnet is that of square wave excitation.

The oscillator 22 can be eliminated by using oscillator 24 to switch relay 21 at a 60 cycle frequency; the two oscillators are used to permit elimination of 60 cycle ground currents produced by other equipment by effectively functioning as a frequency changer which derives a 10 cycle square wave voltage from a 60 cycle sinusoidal voltage. In this event it is necessary to insert conventional filtering networks for passing the 10 cycle frequency through the system while rejecting the 60 cycle frequency. The frequency of oscillator 22 is chosen to be sufficiently less than the ground current frequency to avoid interaction while remaining sufficiently above zero frequency to avoid electrode polarization.

The device 8 comprises a gate relay 23 connected in parallel with relay 21 and synchronized therewith. Due to this synchronization, flow signals will only be transmitted through relay 23 at intervals when the magnetic flux is constant and no quadrature components can be transmitted to meter 11. For applications in which the relay switching transients are objectionable, conventional filtering circuits can be connected to each relay contact. Alternatively, these transients can be eliminated by choosing two different types of relays, so that the relay 21 will have a slightly faster contact switching speed than relay 23; i. e., relay 21 will switch from one position to the other at a slightly faster speed than relay 23. Since the nature of low frequency square wave operation of this kind is such that each relay remains at each extreme position for a much longer period than that required by the contact switching operation, both relays will remain synchronized in position switching frequency, even though relay 21 changes position at a faster rate than relay 23. The slower rate of relay 23 masks the switching transients developed in the flow signal by the continual polarity reversal of direct voltage produced by means of relay 21.

While I have described the invention in the preferred forms shown, it will be understood that modifications can be made within the scope of the invention as defined in the claims which follow.

I claim:

1. In combination with a magnet provided with a gap and a conduit with spaced electrodes oriented within said gap, an electrical generator producing an alternating voltage which attains a constant value over a substantial interval of each half cycle; means coupling said voltage to said magnet to establish a magnetic field across said gap; an electric device characterized by a first electrical state in which a signal can pass unaltered through said device and a second and normal electrical state in which no signal can pass through said device, means coupling the input of said device to said electrodes; and means coupled between said generator and said device to maintain said device in said first state during said intervals.

2. The combination as set forth in claim 1 wherein said alternating voltage is a square wave.

3. A magnetic induction flowmeter comprising a magnet provided with an excitation winding and a gap; a flow-tube with spaced electrodes oriented within said gap; a source of direct voltage; a two-position power relay whose contacts are interposed between the output of said source and the input of said winding in a connection in which said relay when in the first position supplies said direct voltage to said winding with one polarity and when in said second position supplies said direct voltage to said winding with opposed polarity whereby said winding is shock excited with direct voltage of alternating polarity; a flow indicating mechanism; a two-position gate relay, the contacts of said gate relay being interposed between the electrodes and the input to said mechanism to establish a connection therebetween only when the gate relay is in one of its two positions; and means coupled to the windings of both relays to supply position changing signals thereto.

4. A flowmeter as set forth in claim 3 wherein said gate relay has a characteristic contact switching speed which is slightly less than the characteristic contact switching speed of the power relay.

5. A magnetic induction flowmeter comprising a magnet provided with an excitation winding and a gap; a flow-tube with spaced electrodes oriented within said gap; first and second oscillators for generating sinusoidal voltages having first and second frequencies respectively; rectifier means coupled to the output of said first oscillator for deriving a direct voltage therefrom; a two position power relay whose contacts are interposed between the output of said rectifier means and the input to said winding in a connection in which said relay when in the first position supplied said direct voltage to said winding with one polarity and when in said second position supplies said direct voltage to said winding with opposed polarity whereby said winding is shock excited with direct voltage of alternating polarity; a flow indicating mechanism; a two position gate relay, the contacts of said gate relay being interposed between the electrodes and the input to said mechanism to establish a connection therebetween only when the gate relay is one of its two positions; and means coupling the windings to both relays to the output of said second generator to switch said relays between their two positions at a rate equal to said second frequency.

6. A magnetic induction flowmeter comprising a flow tube with spaced electrodes, means establishing a magnetic field having a constant value for reference periods at spaced intervals across the flow tube at said spaced electrodes, the reference periods having a duration sufficient to stabilize the magnetic field, indicator means, means connecting the spaced electrodes to said indicator means and controlled by said magnetic field establishing means for effecting the response of said indicator means only during said reference periods.

7. A magnetic induction flowmeter comprising a magnet provided with a gap; a flow tube with spaced electrodes oriented within said gap; an electrical generator producing a voltage which attains a constant value for reference periods at regularly spaced intervals, means coupling said voltage to said magnet to establish a magnetic field across said gap, each of the reference periods having a duration sufficient to stabilize the magnetic field across the gap; a conditionally responsive voltage transfer device, means coupling the input of said device to said electrodes; and means coupling said generator to said voltage transfer device for rendering said device responsive only during said reference periods.

8. A magnetic induction flowmeter comprising a magnet provided with a gap; a flow tube with spaced electrodes oriented within said gap; an electrical generator producing a voltage which attains a constant value for reference periods at regularly spaced intervals, means coupling said voltage to said magnet to establish a magnetic field across said gap, each of the reference periods having a duration sufficient to stabilize the magnetic field across the gap; a normally inoperative voltage transfer network, means coupling the input of said network to said electrodes; and synchronizing means coupled between said generator and said network to render said network operative only during said reference periods.

9. A magnetic induction flowmeter comprising a magnet provided with a gap; a flow tube with spaced electrodes oriented within said gap; an electrical generator coupled to said magnet and supplying an alternating excitation voltage thereto producing saturation of said magnet over a substantial interval of each half cycle; a meter for indicating rate of flow; conditionally responsive signal transfer means coupled between said electrodes and said meter to transfer signals appearing at said electrodes upon being rendered responsive; and means coupling said generator to said transfer means to render the transfer means responsive only during said saturation intervals.

References Cited in the file of this patent

UNITED STATES PATENTS

| | | |
|---|---|---|
| 2,133,670 | Schuchmann | Oct. 18, 1938 |
| 2,677,093 | Maltby | Apr. 27, 1954 |
| 2,729,103 | Raynsford et al. | Jan. 3, 1956 |

OTHER REFERENCES

Article: "An Induction Flowmeter Design Suitable for Radioactive Fluids," S. G. James, pub. in Review of Scientific Instruments, vol. 22, No. 12, December 1951, pp. 989–1002.

Article: "An Electromagnetic Blood Flowmeter," Clark and Randall, in Review of Scientific Instruments, vol. 20, No. 12, December 1949.